United States Patent Office 3,379,734
Patented Apr. 23, 1968

3,379,734
N₁-(BENZENESULFONYL)-N₂-(TETRAHYDRO-THIAPYRANYL)UREAS
Erich Haack, Heidelberg, Ruth Heerdt, Mannheim, Felix H. Schmidt, Mannheim-Neuostheim, and Kurt Stach, Mannheim, Germany, assignors to C. F. Boehringer & Soehne G.m.b.H., Mannheim-Waldhof, Germany, a corporation of Germany
No Drawing. Continuation of application Ser. No. 411,585, Nov. 16, 1964. This application June 5, 1967, Ser. No. 643,738
Claims priority, application Germany, Nov. 26, 1963. B 74,404
9 Claims. (Cl. 260—327)

ABSTRACT OF THE DISCLOSURE

The invention involves $N_1$ - (benzenesulfonyl) - $N_2$- (terahydro - thiaphranyl)ureas useful as oral antidiabetic activity.

---

This is a continuation of our copending application Ser. No. 411,585, filed Nov. 16, 1964, now abandoned.

This invention relates to a series of new benzenesulfonylureas having utility as antidiabetic agents. More particularly, this invention relates to benzenesulfonylureas in which the $N_2$ substituent consists of a tetrahydrothiapyrane radical. It is known that various benzenesulfonylureas have blood sugar reducing properties and are suitable as oral antidiabetic agents (see, for example, "Arzneimittel-Forschung," vol. 8, pp. 448–454 (1958)). In particular, $N_1$ - sulfanilyl - $N_2$ - (n - butyl) - urea and $N_1$ - (4 - methylbenzenesulfonyl) - $N_2$ - (n - butyl) - urea have acquired great importance in the treatment of diabetes.

In German Patent 1,011,413 benzenesulfonylureas are described substituted by an open chain or cyclic hydrocarbon radical containing hetero atoms on the $N_2$ atom, as, for instance, alkylmercaptoalkyl radicals. These compounds are less toxic than compounds which contain no hetero atoms. However, their antidiabetic effectiveness is also poor.

It has now surprisingly been discovered that benzenesulfonylureas having as the $N_2$ substituent a tetrahydrothiapyrane radical constitute superior antidiabetic compounds having very great blood sugar reducing activity, while their toxicity is just as low or lower than that of the above named compounds of German Patent No. 1,011,413. In view of the strong antidiabetic action and little or no incidence of undesirable side effects, the new compounds can be administered over a broad therapeutic range, such as has seldom, if ever, been achieved with compounds of the sulfonyl series.

The compounds of this invention have the following structural formula:

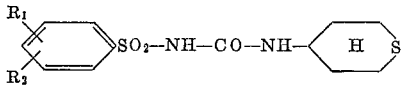

and the salts thereof, wherein $R_1$ and $R_2$ represent hydrogen, halogen, alkyl, alkenyl, alkoxy, alkenoxy, alkylmercapto, acyl, azido, cyano, trifluoromethyl, an amino group or a group which may be converted into an amino group.

The term "salts" as used herein is intended to include all non-toxic or pharmacologically-acceptable alkali, alkaline earth and ammonium salts. Such salts are easily prepared by methods known to the art.

The compounds of this invention are prepared by the methods conventionally used for the synthesis of substituted ureas;

(a) Reaction of benzenesulfonyl compounds of the formula:

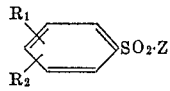

with compounds of the formula:

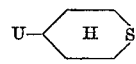

In the above formulae, one of the radicals Z and U represents an amino group while the other is an isocyanate group or a radical which gives rise to an isocyanate group under the conditions of the reaction.

Thus, for example, a sulfonylisocyanate can be reacted with 4 - amino - tetrahydrothiapyrane or an acyl derivative thereof, or, alternatively, a sulfonamide (preferably in the form of its sodium or potassium salt) is condensed with tetrahydrothiapyrane isocyanate former. An "isocyanate former" is understood to mean a compound which, under the conditions of reaction, is capable of conversion into an isocyanic acid ester as, for example, carbamic acid halides, urethanes, thiourethanes, ureas and their acyl derivatives and disulfonylureas.

(b) Hydrolysis of benzenesulfonylthioureas

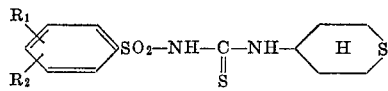

or benzenesulfonylguanidines

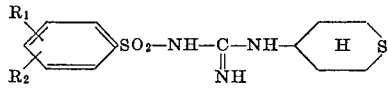

or benzenesulfonylisourea ethers

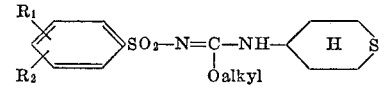

$R_1$ and $R_2$ being as above defined. The hydrolysis of the sulfonylguanidines is best carried out as an alkaline hydrolysis, as, for instance, by means of alkali hydroxide, that of the isourea alkyl ethers as an acid hydrolysis, as, for instance, by means of halogen hydride and that of thioureas as an oxidative hydrolysis as, for instance, by means of nitrous acid.

(c) Reaction of benzenesulfonyl halides of the formula

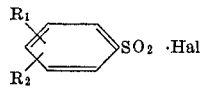

with ureas of the formula

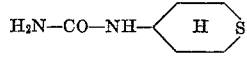

wherein $R_1$ and $R_2$ are as above defined. In this latter method it is advantageous to employ, in place of the tetrahydrothiapyranylureas, the corresponding parabanic acid derivatives

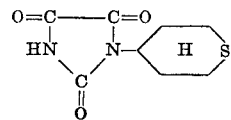

The following examples are drawn to illustrate the novel compounds of this invention and will serve to illustrate the process for the preparation of the compounds.

EXAMPLE 1

5.3 g. 4-methoxy-benzenesulfonyl-methylurethane were mixed with a solution of 2.5 g. 4-amino-tetrahydrothiapyrane in 50 ml. toluene. After dissolution was complete, the solution was heated for 2 hours at 120° C., and at the same time the alcohol which formed during the reaction was distilled off. The solution was then cooled and the concentrate was dissolved in dilute sodium bicarbonate solution. The resulting solution was filtered through charcoal and the $N_1$-(p-methoxy-benzenesulfonyl)-$N_2$-(tetrahydrothiapyranyl-4)-urea separated by precipitation with dilute hydrochloric acid. Yield: 85%, M.P. 204–206° C.

Analogously, the following compounds were produced:

$N_1$ - (p-toluenesulfonyl)-$N_2$-(tetrahydro-thiapyranyl-4)-urea M.P. 209–210° C.

$N_1$ - (p-chloro-benzenesulfonyl)-$N_2$-(tetrahydrothiapyranyl-4)-urea, M.P. 206° C.

EXAMPLE 2

7.3 g. 4-chloro - 3 - acetamino-benzenesulfonyl-methylurethane and 2.8 g. 4-amino-tetrahydro-thiapyrane were dissolved in 75 cc. absolute toluene. The solution was then heated for 2½ hours at 110–115° C. and the alcohol which formed was separated off by distillation. After cooling, the precipitated $N_1$-(4-chloro-3-acetamino-benzenesulfonyl)-$N_2$-(tetrahydrothiapyranyl-4)-urea was recovered by suction filtering and washed with ether. Yield: 96%, M.P. 175–177° C.

EXAMPLE 3

9 g. $N_1$ - (3 - acetamino-4-chloro-benzenesulfonyl)-$N_2$-(tetrahydrothiapyranyl-4)-urea which had been obtained according to Example 2 were dissolved in 35 cc. of 2 N caustic soda solution and the resulting solution heated for 1 hour on the vapor bath. Following neutralization of the alkaline solution, the $N_1$-(3-amino-4-chloro-benzenesulfonyl) - $N_2$ - (tetrahydrothiapyranyl-4)-urea precipitated out. The $N_1$-(3-amino-4-chlorobenzenesulfonyl)-$N_2$-(tetrahydrothiapyranyl)-4-urea was purified by recrystallization from alcohol. Yield 93%, M.P. 192–194° C.

EXAMPLE 4

2.6 g. p-acetyl-benzenesulfonyl-methylurethane were heated in 30 cc. absolute toluene with 1.2 g. 4-amino-tetrahydrothiapyrane for 3 hours at 110–120° C. The alcohol which formed during the reaction was distilled off. After completion of the reaction the precipitate was separated by suction filtering and washed with ether. The washed precipitate was dissolved in dilute sodium bicarbonate solution, any slight residue was filtered out and the filtrate treated with dilute hydrochloric acid. In this manner, $N_1$-(p - acetyl-benzenesulfonyl)-$N_2$-tetrahydrothiapyranyl-4)-urea was obtained, in a 76% yield, M.P. 195–197° C. In an analogous manner $N_1$-(p-isopropyl-benzenesulfonyl) - $N_2$ - (tetrahydrothiapyranyl-4)-urea was prepared, M.P. 201–202° C.

The end products of this process may be combined with a pharmaceutical carrier for administration to humans in an amount to attain the desired antidiabetic effect. Such carriers are either solid or liquid. Exemplary of solid pharmaceutical carriers are lactones, cornstarch, manitol, talc, etc. The compounds of this invention are mixed with a carrier and filled into hard gelatin capsules or tableted with suitable tableting aids such as magnesium, stearate, starch, or other lubricants, disintegrants or coloring agents. If a combination with a liquid carrier is desirable, a soft gelatin capsule is filled with a slurry of the novel compounds in soya bean or peanut oil or with an aqueous suspension or solution thereof.

The blood sugar reducing activities of some of the new antidiabetic compounds are compiled in the table below together with the activities of three known antidiabetic compounds, two of which have a substituent in the $N_2$ position containing hetero-atoms.

The blood sugar reducing activity was measured intravenously in the rabbit, determining in each case the so-called threshold dose, i.e., the smallest dose of a compound which just produced a significant blood sugar reduction. The threshold dose of BZ–55 ("Nadisan," $N_1$=sulfanilyl-$N_2$-(n-butyl)-urea) amounts in this experimental procedure to 200 mg./kg. In the data the values given are relative values in relation to BZ–55=1.

| Substance | Toxicity, LD₅₀ s.c. mouse (g./kg.) | Rel. blood sugar effect |
|---|---|---|
| (1) $N_1$-(p-toluenesulfonyl)-$N_2$-(n-butyl-urea) (Orinase) | 0.78 | 10 |
| (2) $N_1$-(p-toluenesulfonyl)-$N_2$-(3-methylmercaptopropyl)-urea | 1.62 | 5 |
| (3) $N_1$-(p-toluenesulfonyl)-$N_2$-(3-ethylmercaptopropyl)-urea | 0.93 | 2 |
| (4) $N_1$-(p-methoxy-benzenesulfonyl)-$N_2$-(tetrahydrothiapyranyl-4)-urea | 1.62 | 40 |
| (5) $N_1$-(p-toluenesulfonyl)-$N_2$-tetrahydrothiapyranyl 4)-urea | >1.25 | 40 |
| (6) $N_1$-(p-chloro-benzenesulfonyl)-$N_2$-(tetrahydrothiapyranyl-4)-urea | 0.67 | 20 |
| (7) $N_1$-(p-isopropyl-benzenesulfonyl)-$N_2$-(tetrahydrothiapyranyl-4)-urea | 1.25 | 20 |

The novel thiapyranylurea derivatives are thus superior to $N_1$-(p-toluenesulfonyl)-$N_2$-(n-butyl)-urea in the tests. This is especially true in connection with $N_1$-p-methoxybenzenesulfonyl)-$N_2$-(tetrahydrothiapyranyl-4)-urea and $N_1$-(p-toluenesulfonyl) - $N_2$ -(tetrahydrothiapyranyl - 4)-urea. The latter two compounds are four times as effective intravenously than the comparison compound. In connection with the latter two compounds, the toxicities are also slighter than that of $N_1$-(p-toluenesulfonyl)-$N_2$-(n-butyl-urea) ("Orinase") so that a greater therapeutic range is made possible. It should also be noted that in a similar experimental arrangement but where the compound was administered per os $N_1$-(p-toluenesulfonyl)-$N_2$-,tetrahydrothiapyranyl-4)-urea was ten times more effective than $N_1$-(p-toluenesulfonyl)-$N_2$-(n-butyl-urea) ("Orinase").

On the other hand, the alkylmercaptoalkyl compounds $N_1$-(p-toluenesulfonyl)-$N_2$ - (3 - methylmercaptopropyl)-urea and $N_1$-(p - toluenesulfonyl)$N_2$ - (3 - ethylmercaptopropyl)urea disclosed in German Patent No. 1,011,413 are less toxic than $N_1$-(p-toluenesulfonyl)-$N_2$-(n-butyl-urea) ("Orinase") but are substantially inferior in antidiabetic activity to $N_1$-(p-toluenesulfonyl) - $N_2$ - (n - butyl - urea) ("Orinase").

The fact that the new thiapyrane derivatives are simultaneously very effective and less toxic can therefore be characterized as very surprising.

We claim:

1. A compound selected from the group consisting of compounds of the formula:

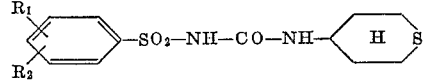

and the salts thereof with a pharmaceutically acceptable base wherein each of $R_1$ and $R_2$ is selected from the group consisting of hydrogen, halogen, methyl, isopropyl, acetyl, methoxy, acetamido, azido, cyano, trifluoromethyl and amino.

2. A compound according to claim 1 designated $N_1$-(p-methoxy benzene sulfonyl) - $N_2$ - (tetrahydrothiapyranyl-4)-urea.

3. A compound according to claim 1 designated $N_1$-(p-toluenesulfonyl)-$N_2$-(tetrahydro - thiapyranyl - 4)-urea.

4. A compound according to claim 1 designated $N_1$ - p-chloro - benzenesulfonyl) - $N_2$ - (tetrahydrothiapyranyl)-4)-urea.

5. A compound according to claim 1 designated $N_1$-(4-chloro-3-acetamino-benzenesulfonyl) - $N_2$ - (tetrahydro-thiapyranyl-4)-urea.

6. A compound according to claim 1 designated $N_1$-(3-amino-4-chlorobenzenesulfonyl) - $N_2$ - (tetrahydrothiapyranyl-4)-urea.

7. A compound according to claim 1 designated $N_1$-p-isopropyl-benzenesulfonyl) - $N_2$ - (tetrahydro - thiapyranyl-4)-urea.

8. A compound according to claim 1 in the form of its sodium or potassium salt.

9. A compound according to claim 1 designated $N_1$-(p-acetyl-benzenesulfonyl) - $N_2$ - (tetrahydro - thiapyranyl-4)-urea.

References Cited

UNITED STATES PATENTS

| | | | |
|---|---|---|---|
| 2,953,578 | 9/1960 | Haack et al. | 260—347.2 |
| 3,100,208 | 8/1963 | Haack et al. | 260—347.2 |

FOREIGN PATENTS 797,474   7/1958   Great Britain.

OTHER REFERENCES

Marshall et al. J. Medicinal and Pharmaceutical Chem., vol. 6 (1963), pp. 60–3.

JAMES A. PATTEN, *Primary Examiner.*